(12) United States Patent
Altinger et al.

(10) Patent No.: US 11,259,375 B2
(45) Date of Patent: Feb. 22, 2022

(54) LIGHTING DEVICE AND LIGHTING SYSTEM FOR A MOTOR VEHICLE AND METHOD FOR OPERATING A LIGHTING SYSTEM FOR A MOTOR VEHICLE

(71) Applicant: Bayerische Motoren Werke Aktiengesellschaft, Munich (DE)

(72) Inventors: Florian Altinger, Shenyang/Heping District (CN); Juergen Bruegl, Munich (DE); Robert Isele, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/400,902

(22) Filed: May 1, 2019

(65) Prior Publication Data

US 2019/0261483 A1    Aug. 22, 2019

Related U.S. Application Data

(63) Continuation of application No. PCT/EP2017/076526, filed on Oct. 18, 2017.

(30) Foreign Application Priority Data

Nov. 7, 2016    (DE) .................... 10 2016 221 772.0

(51) Int. Cl.
*H05B 45/20* (2020.01)
*H05B 45/24* (2020.01)
(Continued)

(52) U.S. Cl.
CPC ............. *H05B 45/20* (2020.01); *H05B 45/22* (2020.01); *H05B 45/24* (2020.01); *H05B 47/18* (2020.01); *H05B 45/28* (2020.01)

(58) Field of Classification Search
CPC .......... B60R 21/01516; B60R 21/0152; B60R 21/0153; B60R 21/01542;
(Continued)

(56) References Cited

U.S. PATENT DOCUMENTS

2009/0237011 A1    9/2009    Shah et al.
2010/0219758 A1    9/2010    Melzner et al.
(Continued)

FOREIGN PATENT DOCUMENTS

CN    101666455 A    3/2010
CN    103098544 A    5/2013
(Continued)

OTHER PUBLICATIONS

German-language European Office Action issued in European application No. 17 784 956.9-1202 dated Apr. 6, 2020 (Seven (7) pages).
(Continued)

*Primary Examiner* — Monica C King
(74) *Attorney, Agent, or Firm* — Crowell & Moring LLP

(57) ABSTRACT

A lighting apparatus for a motor vehicle includes a processing module configured to receive, process and send signals from a data bus of the motor vehicle, and a light-emitting diode (LED) unit configured to emit light of adjustable brightness and prescribed color locus. The LED unit has a microcontroller and a plurality of LEDs, where the microcontroller and the LEDs are surrounded by a package of the LED unit. The LED unit is further configured to communicate bidirectionally with the processing module so that a present status value of the LED unit, which status value is representative of a functionality of the LED unit, is ascertainable by the LED unit and the processing module.

18 Claims, 3 Drawing Sheets

(51) Int. Cl.
*H05B 45/22* (2020.01)
*H05B 47/18* (2020.01)
*H05B 45/28* (2020.01)

(58) Field of Classification Search
CPC ........ B60R 21/01534; B60R 21/01536; B60R 16/037; B60R 2001/1223; B60R 2001/1253; B60R 2021/0027; B60R 2021/01315; B60R 2021/23153; B60R 2021/26094; B60R 2021/2765; B60R 2022/208; B60R 2022/288; B60R 2022/4685; B60R 2022/4825; B60R 21/013; B60R 21/0132; B60R 21/0134; B60R 21/0136; B60R 21/015; B60R 21/01532; B60R 21/01538; B60R 21/01544; B60R 21/01546; B60R 21/01548; B60R 21/01552; B60R 21/01554; B60R 21/203; B60R 21/21656; B60R 21/276; B60R 22/20; B60R 22/201; B60R 25/25; B60R 25/252; B60R 25/255; B60R 25/257; H05B 33/086; H05B 33/0866; H05B 37/0254
See application file for complete search history.

(56) References Cited

U.S. PATENT DOCUMENTS

2011/0255303 A1* 10/2011 Nichol ................. G02B 6/0018
   362/606
2011/0309746 A1    12/2011 Eckel et al.
2014/0009063 A1*    1/2014 Cregg .................... H05B 47/19
   315/34
2015/0351173 A1    12/2015 Dunser et al.
2018/0279429 A1*    9/2018 Sadwick .............. F21V 23/0471

FOREIGN PATENT DOCUMENTS

| CN | 104956772 A | 9/2015 |
| CN | 205305209 U | 6/2016 |
| DE | 20 2005 020 801 U1 | 10/2006 |
| DE | 10 2008 030 365 A1 | 8/2009 |
| DE | 10 2015 009 736 A1 | 7/2016 |
| WO | WO 2007/003006 A1 | 1/2007 |
| WO | WO 2011/160111 A1 | 12/2011 |
| WO | WO 2014/067830 A1 | 5/2014 |

OTHER PUBLICATIONS

PCT/EP2017/076526, International Search Report dated Jan. 5, 2018 (Three (3) pages).

German Search Report issued in German counterpart application No. 10 2016 221 772.0 dated May 5, 2017, with Statement of Relevancy (Eight (8) pages).

Chinese Office Action issued in Chinese application No. 201780051937.3 dated Jul. 1, 2020 (Eight (8) pages).

Chinese Office Action issued in Chinese application No. 201780051937.3 dated Jul. 21, 2021, with English translation (Fifteen (15) pages).

* cited by examiner

LIGHTING DEVICE AND LIGHTING SYSTEM FOR A MOTOR VEHICLE AND METHOD FOR OPERATING A LIGHTING SYSTEM FOR A MOTOR VEHICLE

CROSS REFERENCE TO RELATED APPLICATIONS

This application is a continuation of PCT International Application No. PCT/EP2017/076526, filed Oct. 18, 2017, which claims priority under 35 U.S.C. § 119 from German Patent Application No. 10 2016 221 772.0, filed Nov. 7, 2016, the entire disclosures of which are herein expressly incorporated by reference.

BACKGROUND AND SUMMARY OF THE INVENTION

The invention relates to a lighting apparatus and a lighting system for a motor vehicle and to a corresponding method for operating a lighting system that allow a space-saving arrangement and reliable and extended operation of the lighting apparatus.

Lighting apparatuses in motor vehicles having multicolor LED units (LED="light-emitting diode") are known from the prior art. Such LED units normally comprise multiple single-color LEDs and are usually actuated by means of LED drivers in order to vary a desired brightness and a color locus (i.e. a mixed color). This is accomplished by using a module having a microprocessor that firstly undertakes communication with a motor vehicle data bus and secondly drives the LED units, usually via PWM outputs (PWM="pulse-width modulation"). The motor vehicle data bus frequently used in this case is what is known as the LIN bus (LIN="Local Interconnect Network").

Some multicolor LED units have an integrated circuit accommodated in a package together with the single-color LEDs, which are controlled by means of a data stream. In this case, configurations that are needed in lighting apparatuses having multicolor LED units to operate the individual LED units are deposited in a central processing module.

The document WO 2014/067830 A1 discloses a method and an arrangement for temperature-corrected control of LEDs by means of look-up tables. In this case, an LED module comprising multiple LED channels for each target color locus achievable by the LED module has provision in it for a lookup table storing the operating current for each LED channel on the basis of temperature.

It is an object on which the invention is based to provide a lighting apparatus and a lighting system for a motor vehicle and also a corresponding method for operating a lighting system that allow a space-saving arrangement and can contribute to reliable and extended operation of the lighting apparatus.

According to a first aspect of the invention, a lighting apparatus for a motor vehicle comprises a processing module designed to receive, process and send signals from a data bus of the motor vehicle. The lighting apparatus further comprises an LED unit designed so as in an operational state to emit light of adjustable brightness and prescribed color locus, wherein the LED unit has a microcontroller and a plurality of LEDs and wherein the microcontroller and the LEDs are surrounded by a package of the LED unit. The LED unit is further designed to communicate bidirectionally with the processing module, so that a present status value of the LED unit, which status value is representative of a functionality of the LED unit, is ascertainable by means of the LED unit and the processing module.

The described lighting apparatus can be used to provide a space-saving lighting function, for example in order to light a section in or on a motor vehicle, and the described design furthermore allows a present status value of the LED unit to be recalled by virtue of the LED unit communicating with the processing module by signaling, so that the LED unit can have its functionality monitored. The LED unit produces a semiconductor device that, in an emitting mode, emits light of prescribed color when a voltage or electric current is applied.

Furthermore, on the basis of the described design and the communication capability, the LED unit can be used to provide information regarding a status by virtue of the LED unit sending status signals representative of a functionality to the processing module continuously, at prescribed intervals of time or at the request of the latter. By way of example, such status signals comprise data about a current/voltage characteristic or a number of operating hours, so that conclusions about a lifespan are possible. The described lighting apparatus with LED unit thus allows present operating data to be read, so that a contribution is made to reliable and controlled operation.

By way of example, as a result of a recalled or ascertained voltage characteristic that suggests that a brightness of the inspected LED is below a prescribed threshold value, a supply of current to this LED can be increased in order to increase the brightness of this LED to within a prescribed tolerance range. Additionally, for example as a result of an ascertained operating period of an LED that will exceed a probable lifespan of this LED in the near future, information about this state of the LED or of the associated LED unit, and recommending replacement of this LED, can be output.

On the basis of the described design of the lighting apparatus and the bidirectional communication capability of a respective LED unit, data of a respective LED unit can be collected at any time that are in particular able to contribute to maintaining or improving what is known as the ASIL standard (ASIL="Automotive Safety Integrity Level"). The aim of said standard is to ensure a prescribed basic safety level. In this way, it is possible for example to monitor a reliability of an LED on a gear indicator of a motor vehicle that, for controlled and safe operation of the motor vehicle, needs to reliably provide information about whether a forward gear "D" or reverse gear "R" is selected, for example.

The management module can be used to enquire of the applicable LED whether a light-emitting operating state exists and hence to check the functionality of the LED. In this way, every single LED unit can be selectively actuated and a present status value can be recalled, the same interface as is used for operating and actuating the LED unit also being used for diagnosis. This is made possible by virtue of each LED unit having a microcontroller arranged specifically in the package and being digitally actuatable and accordingly requiring no actuation by means of a power supply in this regard. On the basis of the bidirectional communication capability, the LED unit capable of lighting can further be used to allow data containing information about a functionality of the LED unit to be read back from the LED unit.

The lighting apparatus is intended for a motor vehicle, such as, for example, a passenger vehicle and if need be also a truck. Preferably, the lighting apparatus has multiple LED units that each comprise a microcontroller and multiple LEDs that are each integrated in a common package of the respective LED unit. A single LED unit therefore produces a semiconductor device, which, owing to the internal microcontroller, can also be referred to as a "smart" LED.

Preferably, the respective LED unit is connected to an internal data bus (i.e. a data bus inside the lighting apparatus), which is in turn coupled to the processing module. The processing module can be used to receive, process and send signals. Such signals comprise, by way of example, external control commands from a motor vehicle data bus that are able to be converted into internal control commands, and put onto the internal data bus, by means of the processing module in order to adjust the brightness and the color locus of one or more LED units. The internal data bus can be e.g. an SPI data bus (SPI="Serial Peripheral Interface") or if need be also another data bus, such as e.g. a differential data bus, that encodes digital data by using a voltage difference between two lines. The motor vehicle data bus can be a LIN bus (LIN="Local Interconnect Network") or a CAN bus (CAN="Controller Area Network"), for example.

The one or more LED units each have adjustable brightness (i.e. light intensity) and emit light of a prescribed color locus. The term color locus describes a color of the emitting light and can be realized in a single color or as a mixed color produced by the respective LED unit. The color locus can be indicated as a locus in a color chart, for example, in particular in a color chart of the CIE standard chromaticity system (CIE="Commission Internationale de l'Éclairage").

For example, an LED unit can have multiple LEDs that each emit blue light or light of different color or wavelength. In the latter case, the LED unit produces a multicolor LED unit of adjustable color locus. A respective LED unit, as a single semiconductor device, preferably has at least three single-color LEDs of different color that are accommodated in a common package of the semiconductor device together with the microcontroller of the LED unit. The design of a semiconductor element of this kind allows a prescribed emission of light based on the electronic semiconductor properties and can furthermore be used to ascertain a status value of the respective LED unit, which status value can be provided to the processing module and/or to the microcontroller. Such ascertaining of a status value of an LED or of an LED unit can be performed both during a light-emitting mode and independently of such a mode.

The described lighting apparatus therefore has a multiplicity of functions that are each integrated in a semiconductor package of an LED unit, so that cabling or wiring required between the LED unit and the processing module can be reduced and the processing module as an actuation controller can be configured to be smaller. In this way, a space-saving design of the lighting apparatus can be produced that can have an advantageous effect on possible installation positions in or on a motor vehicle. Such an installation space advantage is present in particular in the case of a lighting apparatus having a large number of LED units.

According to one development of the lighting apparatus, the microcontroller and the processing module are designed to communicate bidirectionally with one another. The processing module is in particular configured to communicate with the LED unit or with the microcontroller by signaling and to ascertain a present status value. Such communication comprises receiving and sending data and can be effected directly between the respective components capable of communication.

According to one development of the lighting apparatus, the LED unit is in the form of a multicolor LED unit and the LEDs are each in the form of single-color LEDs. According to a further development of the lighting apparatus, the LED unit comprises an RGB LED unit and/or an RGBW LED unit. In a manner known per se, an RGB LED unit comprises a red, a green and a blue single-color LED and an RGBW LED unit also comprises a white-light LED in addition to a red, a green and a blue LED.

According to one development of the lighting apparatus, the LED unit comprises a light sensor designed to measure a present brightness value on the LED unit and to communicate bidirectionally with the processing module, so that the present brightness value on the LED unit is recallable or ascertainable by means of the light sensor and the processing module. In this way, a present brightness value at the location of the respective LED unit, which brightness value can in particular contain information about a brightness of the ambient light, can be ascertained and recalled at any time independently of actuation and operation of the respective LEDs.

According to one development of the lighting apparatus, the LED unit has a temperature sensor designed to measure a present temperature value on the LED unit and to communicate bidirectionally with the processing module, so that the present temperature value on the LED unit is recallable or ascertainable by means of the temperature sensor and the processing module. The temperature sensor can be used to collect further data of the LED unit that are able to contribute to reliable and extended operation of the lighting apparatus.

On the basis of the described design of the lighting apparatus or of a respective LED unit, the processing module as an actuation module can be of smaller embodiment, so that a further contribution is made to a clear and space-saving design. Furthermore, a multiplicity of LED units arranged in and/or on a motor vehicle in an installed state can be used to ascertain correlations over a vehicle collective of the motor vehicle and to obtain information about status values and local characteristics of a respectively installed LED unit. Such data collection also allows data to be retrieved even if a voltage is in the meantime no longer present. In such a case, a previous actual state of the LED unit is then recalled, for example.

According to a further aspect of the invention, a lighting system for a motor vehicle comprises at least one configuration of the above-described lighting apparatus and the motor vehicle. The lighting apparatus is in particular arranged and installed in or on the motor vehicle and forms an interior lighting and/or an exterior lighting. The motor vehicle can also have multiple configurations of the described lighting apparatus, one of which is arranged in and another of which is arranged on the motor vehicle and performs an applicable lighting function, for example. This allows appealing light effects with a homogeneous appearance to be generated. Furthermore, the lighting apparatus allows a present status value of the respective LED unit to be recalled even independently of the operating state of the LEDs and of a possibly activated lighting function. Since the lighting system comprises at least one configuration of the above-described lighting apparatus, all of the features and properties of the lighting apparatus are also disclosed for the lighting system, and vice versa.

According to a further aspect of the invention, a method for operating a configuration of the above-described lighting system for a motor vehicle comprises receiving status signals of the LED unit that are representative of a functionality of the LED unit. The method further comprises ascertaining a present status value of the LED unit on the basis of the received status signals of the LED unit and controlling a function of the motor vehicle on the basis of the ascertained status value of the LED unit.

The described method allows a present status value of the respective LED unit of the lighting system or of the lighting apparatus to be recalled, so that, by way of example, information about a current or voltage characteristic or about a number of operating hours of an individual LED or of a respective LED unit can be ascertained. The controlling of a function of the motor vehicle can comprise the operation of the LED unit or of the lighting function of the lighting apparatus, but the described method also allows a function to be controlled on the basis of the ascertained status value apart from the light-emitting mode of the LED unit.

The data collected by means of the LED unit are collected and evaluated, or provided for later processing, by the processing module. The ascertained status value can be stored in a database of the motor vehicle or in an external database, for example, and deposited for further evaluations in order to be able to ascertain a brightness profile, for example. The ascertained status value can also be used to adjust the lighting function of the lighting apparatus, for example, or to provide an output having information regarding the ascertained status value.

A provided output of this kind can signal to the driver of the motor vehicle, for example by means of a signal output capable thereof, that a functionality of an LED or of an LED unit is limited and is not there. Furthermore, an ascertained status value containing data about an LED unit that is not working or is working incorrectly can bring about deactivation of one of the functions of the motor vehicle. By way of example, it is ascertained that an LED unit on a gear indicator is not working, which means that operation of the motor vehicle is deactivated or at least acquires separate enabling.

Exemplary embodiments of the invention are explained in more detail below on the basis of the schematic drawings, in which:

Other objects, advantages and novel features of the present invention will become apparent from the following detailed description of one or more preferred embodiments when considered in conjunction with the accompanying drawings.

Elements having the same design or function are denoted by the same reference signs throughout the figures. For reasons of clarity, if necessary not all depicted elements are denoted by associated reference signs in all of the figures.

DETAILED DESCRIPTION OF THE DRAWINGS

Figure 1:
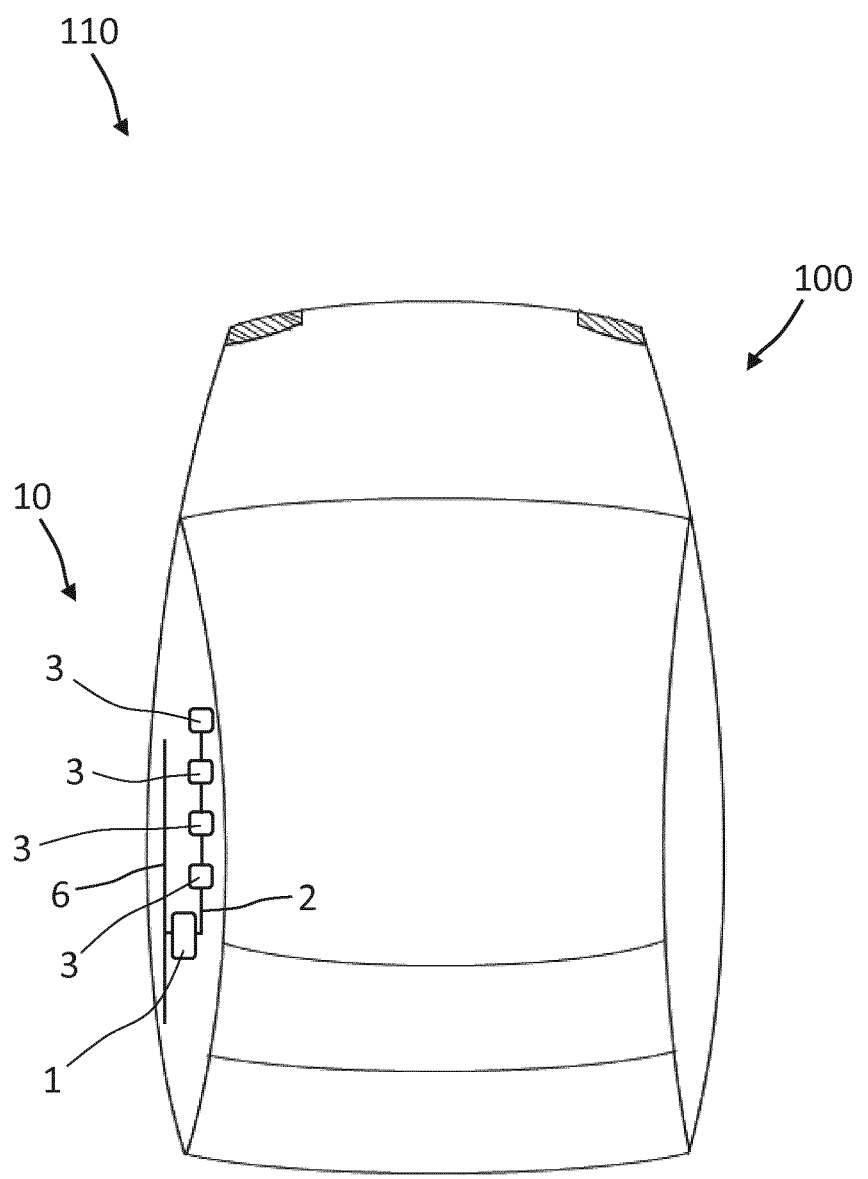
FIG. 1 shows an exemplary embodiment of a lighting system for a motor vehicle in a schematic plan view.
Figure 1:
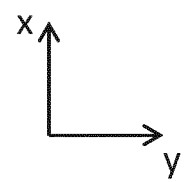

FIG. 1 uses a plan view to schematically illustrate a lighting system 110 comprising a motor vehicle 100 and a lighting apparatus 10 having a plurality of LED units 3. The LED units 3 are each coupled to an internal data bus 2 that in turn couples the LED units 3 to a processing module 1. The processing module 1 is in turn coupled to a motor vehicle data bus 6.

As explained in more detail on the basis of FIGS. 2 and 3 below, the lighting apparatus 10 or the lighting system 110 allows a space-saving lighting function, for example in order to light a section in or on the motor vehicle 100, and furthermore allows ascertainment of a present brightness value at the location of the a respective LED unit 3.

Figure 2:
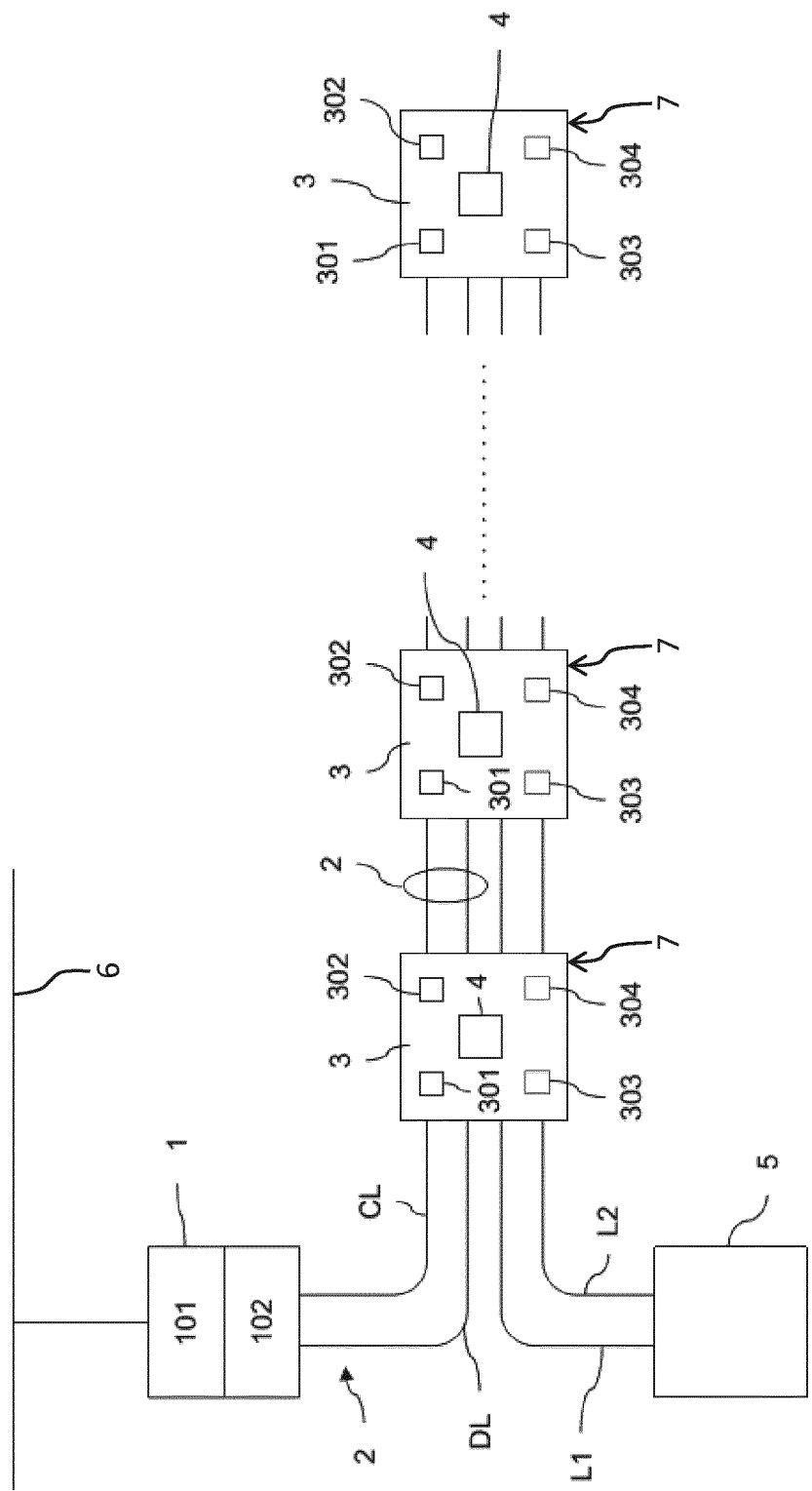
FIG. 2 shows an exemplary embodiment of a lighting apparatus for a motor vehicle in a schematic depiction.

FIG. 2 schematically depicts an embodiment of the lighting apparatus 10 that, as illustrated in FIG. 1, forms an interior lighting in the motor vehicle 100, for example. Alternatively, the lighting apparatus 10 can be arranged on the motor vehicle 100 as exterior lighting or the lighting system 110 comprises multiple lighting apparatuses 10 installed in and/or on the motor vehicle 100.

As illuminants, the lighting apparatus 10 has a plurality of multicolor LED units 3 arranged on a band. These multicolor LED units 3, which are subsequently also referred to simply as LED units 3, each produce a single semiconductor device having multiple single-color LEDs 301-304 and a microcontroller 4. The single-color LEDs 301-304 and the microcontroller 4 are surrounded by a package 7 of a respective LED unit 3. In one embodiment of the lighting apparatus 10, these components are integrated in the package 7 of the semiconductor device together with a sensor 8 (see FIG. 3), which is in the form of a light sensor, for example, in order to be able to ascertain a present brightness value on the LED unit 3. Alternatively or additionally, the sensor 8 is in the form of a temperature sensor, so that a present temperature value at the location of the LED unit 3 can be ascertained.

The single-color LED 301 is for example in the form of a red LED, the single-color LED 302 is in the form of a green LED, the single-color LED 303 is in the form of a blue LED and the single-color LED 304 is in the form of a white LED. The color details in this case relate to the color or the wavelength or the wavelength range of the light emitting from the respective LED. The LED units 3 arranged in the form of a band can be used to achieve a very high packing density (depending on the package shape of for example 144 to 367 LEDs/m), which means that a space-saving design is attainable by means of the lighting apparatus 10.

The individual LED units 3 are actuated by means of a digital datastream in the form of a bitstream that is supplied to the individual LED units 3 by means of the internal data bus 2 of the lighting apparatus 10. The internal data bus 2 comprises a line CL for the clock and a line DL for the bitstream.

The signals on the internal data bus 2 come from the processing module 1 coupled to the motor vehicle data bus 6 of the motor vehicle 100. The processing module 1 comprises a LIN transceiver 101, which taps off applicable digital signals for actuating the LED units 3 from the motor vehicle data bus 6, and a microprocessor 102, which converts the tapped-off signals into applicable data signals on the data line DL of the internal data bus 2. The signals transmitted on the motor vehicle data bus 6 in this instance comprise signals that are intended for the lighting apparatus 10 and stipulate a light pattern to be selected for the lighting apparatus 10.

These signals in turn come from a controller of the motor vehicle 100 that, by way of example, takes an input by the driver as a basis for stipulating the light pattern to be generated and puts it onto the motor vehicle data bus 6 as an applicable signal. The processing module 1 is used to detect whether the light pattern is intended for the lighting apparatus in accordance with the present signal on the motor vehicle data bus 6. If this is the case, the signal is converted into an applicable signal for the internal data bus 2 by means of the microprocessor 102.

The motor vehicle data bus 6 is a LIN bus (LIN="Local Interconnect Network"), for example. The internal data bus 2 can be an SPI bus (SPI="Serial Peripheral Interface"), for example. Preferably, the signals for the internal data bus 2 are generated by the microprocessor 102 by means of a piece of SPI software in this case. A piece of SPI software is a program library that allows any free pins of the microprocessor 102 to be used for signal delivery to the SPI bus. Alternatively, however, SPI hardware can also be used. In this case, specific SPI pins are intended for signal delivery to the SPI bus. The use of SPI software is advantageous, since there can be provision in the internal data bus 2 for multiple lines DL and CL for actuating a larger number of LED units 3. The internal data bus 2 can, as an alternative to an SPI bus, also be configured as a differential data bus or as any other data bus. A differential data bus is distinguished in that it encodes digital data by using a voltage difference between two lines.

In the embodiment shown in FIG. 2, besides the lines CL and DL, there is provision for two power lines L1 and L2 that are connected to a DC power supply 5. Based on the bitstream received via the data line DL, pulse-width modulation (PWM) of the current supplied for the individual LEDs 301-304 is effected in order thereby to actuate the LEDs 301-304 in accordance with the bitstream on the data line DL.

Figure 3:
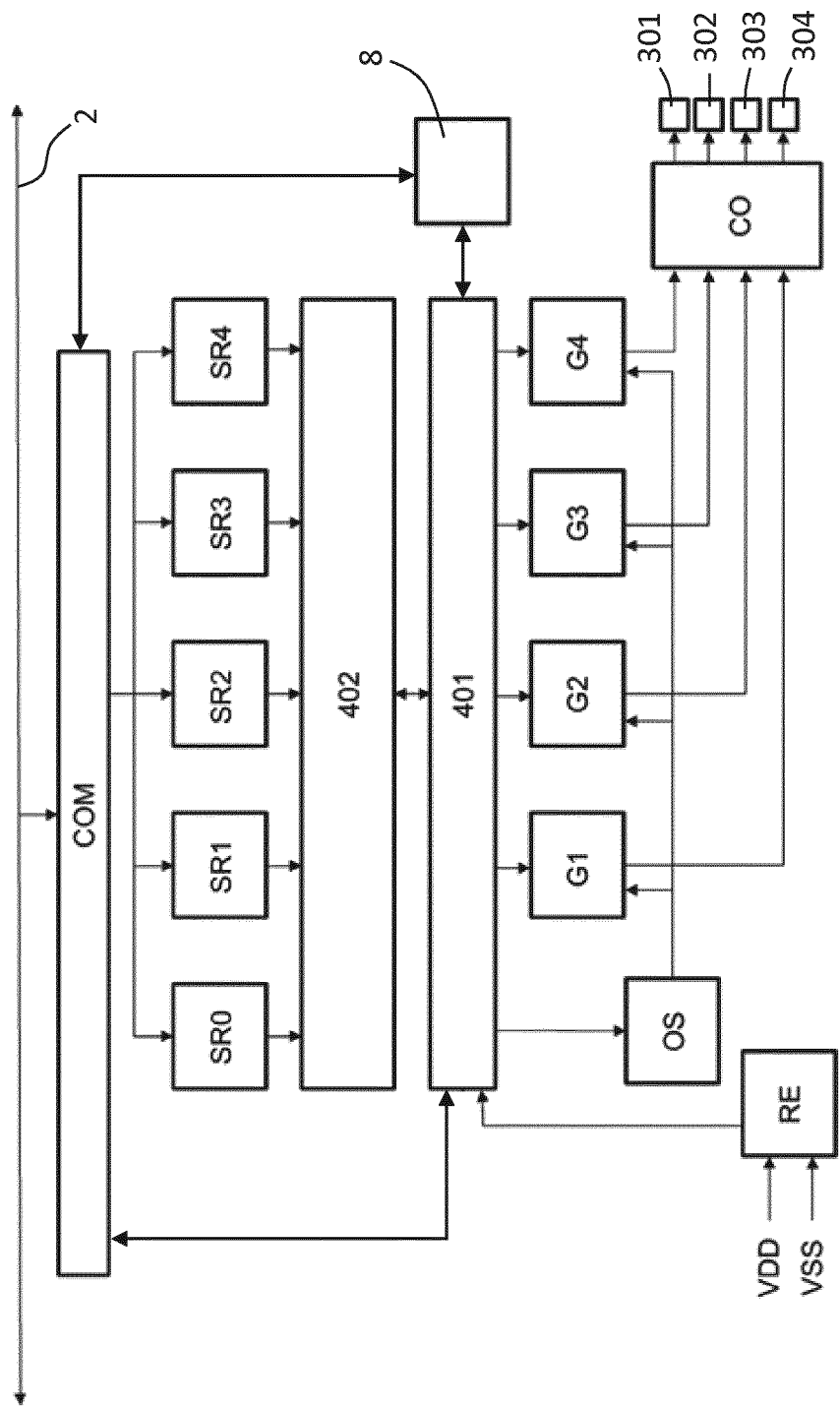
FIG. 3 shows an exemplary embodiment of an LED unit of the lighting apparatus shown in FIG. 2 in a detail view.

The design of a single LED unit 3 as shown in FIGS. 1 and 2 is illustrated in detail in FIG. 3. The depicted components of the LED unit 3 are in this case integrated in a single semiconductor device. The signals of the internal data bus 2 are received via a communication interface CON of the LED unit 3. The clock signal of the clock line CL is forwarded to the microprocessor 401 described later on, whereas the datastream of the data line DL, after decoding in the communication interface COM, is passed to 8-bit shift registers SR0-SR4. In this case, the value output by the shift register SR0 indicates the desired total brightness of the LED unit 3, whereas the values of the shift registers SR1 to SR4 are used to output the color components of the individual single-color LEDs 301-304 to produce the desired mixed color. In particular, the shift register SR1 is used to output the color component of the red-emitting LED 301, the shift register SR2 is used to output the color component of the green-emitting LED 302, the shift register 303 is used to output the color component of the blue emitting LED 303 and for the shift register 304 is used to output the color component of the white-light-emitting LED 304.

The values of the individual shift registers are supplied to the microcontroller 4, which has logic or a microprocessor 401 and an associated nonvolatile EEPROM memory 402. This memory 402 can have in particular calibration data deposited in it that come from a calibration process of the LED unit 3 and stipulate, for a prescribed standard temperature value of the LED unit 3, how the operating currents of the individual single-color LEDs 301-304 need to be selected so that the total brightness coming from the shift register SR0 and the color mix (i.e. the color locus in this regard) are achieved in accordance with the values from the shift registers SR1 to SR4.

The microprocessor 401 resorts to the values deposited in the memory 402 and can receive a present brightness and/or temperature value by means of the sensor 8 integrated in the semiconductor device of the LED unit 3. On the basis of the capability of the LED unit 3 or of the microcontroller 4 of bidirectional communication with the processing module 1, a present status value of the LED unit 3, which status value can provide information about a functionality of the LED unit 3, can be ascertained continuously, at prescribed intervals of time or at the request of the processing module 1. The processing module 1 can be used to selectively actuate a respective LED unit 3 and to recall a present status value.

The microprocessor 401 has a temperature and/or brightness algorithm deposited in it, for example, that, by accessing the memory 402, determines the applicable operating currents for the aforementioned standard temperature value and corrects these operating currents in suitable fashion in the event of disparity between the present temperature and/or brightness value coming from the sensor 8 and the standard temperature value.

In this way, a desired brightness and a prescribed color locus can be adjusted to suit a brightness of the ambient light in controlled fashion in accordance with the values from the shift registers SR0-SR4 in order to attain an appealing or desired light pattern by means of the lighting apparatus 10. The temperature/brightness algorithm of the microprocessor 401 can therefore take into consideration the fact that the temperature and/or brightness at the location of the LED unit 3 can affect an outer appearance, so that a temperature and/or brightness-dependent correction is performable to achieve a desirable brightness and a desirable color locus.

The sensor 8 is designed to use the communication interface COM to communicate with the processing module 1. Such communication comprises receiving and sending signals or data of the respective components. By way of example, the processing module 1 requests the present temperature and/or brightness value from the sensor 8 at prescribed intervals of time, so that the sensor 8 measures the temperature and/or brightness and provides the status signals for the processing module 1. Alternatively or additionally, communication between the processing module 1 and the sensor 8 can be effected by means of the microcontroller 401 of the respective LED unit 3, which microcontroller is coupled to the processing module 1 and to the sensor 8 for signaling purposes and allows bidirectional communication between the two components.

The operating currents for the individual LEDs 301-304 are provided by means of a voltage regulator RE that obtains the positive voltage VDD and the negative VSS from the power supply 5 shown in FIG. 2. The microprocessor 401 further generates a clock pulse for an applicable oscillator OS, which is supplied to PWM generators G1-G4. The operating currents of the individual LEDs 301-304 are produced in the generators G1 to G4 by means of pulse-width modulation. The values of the operating currents, which values come from the algorithm for temperature and/or brightness compensation, are passed to the individual generators G1-G4 by the microprocessor 401. The generator G1 uses pulse-width modulation to produce the current for the red-emitting LED 301, the generator G2 produces the current for the green-emitting LED 302, the generator G3 produces the current for the blue-emitting LED 303 and the generator G4 produces the current for the white-emitting LED 304. The PWM signals generated by the individual generators, which signals reach the single-color LEDs 301-304 via the current output CO, are then used to select the applicable light having the desired brightness and the desired color locus for LED unit 3 according to the signal that reaches the LED unit 3 via the internal data bus 2.

The described lighting apparatus 10 and the lighting system 110 can be used to usefully control the light-emitting mode and further functions of the motor vehicle 100. By way of example, apart from the lighting function, information regarding an ascertained status value can be output, so that a contribution is made to reliable and safe operation of the lighting apparatus 10 and the motor vehicle 100.

LIST OF REFERENCE SIGNS

1 Processing module
10 Lighting apparatus
100 Motor vehicle
101 LIN transceiver
102 Microprocessor
110 Lighting system
2 Internal data bus
3 Multicolor LED unit
301-304 Single-color LEDs
4 Microcontroller
401 Microprocessor
402 EEPROM
5 Power supply
6 Motor vehicle data bus
7 Package of the LED unit
8 Sensor
CL Line for clock signal
CO Current output
COM Communication interface
DL Data line
G1-G4 PWM generators
L1-L2 Power lines
OS Oscillator
RE Voltage regulator
SR0-SR4 Shift registers
VDD, VSS Voltages The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting apparatus for a motor vehicle, comprising:
a processing module configured to receive, process and send signals from an internal data bus;
a light-emitting diode (LED) unit configured to emit light of adjustable brightness and prescribed color locus, wherein the LED unit has a microcontroller and a plurality of LEDs,
wherein the microcontroller and the LEDs are surrounded by a package of the LED unit,
wherein the LED unit is further configured to communicate bidirectionally with the processing module via the microcontroller of the LED unit so that a present status value of the LED unit is receivable by the processing module from the microcontroller of the LED unit, which present status value is representative of a functionality of the LED unit; and
a plurality of LED units, wherein individual LED units of the plurality of LED units are actuated by a digital datastream in a form of a bitstream that is supplied to the individual LED units by the internal data bus of the lighting apparatus and wherein the internal data bus comprises a line for a clock and a line for the bitstream.

2. The lighting apparatus as claimed in claim 1, in which the present status value of the LED unit is ascertainable independently of an operating state of the LEDs.

3. The lighting apparatus as claimed in claim 1, wherein the LED unit is a multicolor LED unit and the LEDs are each single-color LEDs.

4. The lighting apparatus as claimed in claim 1, wherein the LED unit comprises an RGB LED unit and/or an RGBW LED unit.

5. The lighting apparatus as claimed in claim 1, wherein the LED unit comprises a light sensor configured to measure a present brightness value on the LED unit and to communicate bidirectionally with the processing module so that the present brightness value on the LED unit is ascertainable by the light sensor and the processing module.

6. The lighting apparatus as claimed in claim 2, wherein the LED unit comprises a light sensor configured to measure a present brightness value on the LED unit and to communicate bidirectionally with the processing module so that the present brightness value on the LED unit is ascertainable by the light sensor and the processing module.

7. The lighting apparatus as claimed in claim 1, wherein the LED unit comprises a temperature sensor configured to measure a present temperature value on the LED unit and to communicate bidirectionally with the processing module so that the present temperature value on the LED unit is ascertainable by the temperature sensor and the processing module.

8. The lighting apparatus as claimed in claim 2, wherein the LED unit comprises a temperature sensor configured to measure a present temperature value on the LED unit and to communicate bidirectionally with the processing module so that the present temperature value on the LED unit is ascertainable by the temperature sensor and the processing module.

9. A lighting system for a motor vehicle, comprising:
the motor vehicle, and
at least one lighting apparatus comprising:
a processing module configured to receive, process and send signals from an internal data bus,
a light-emitting diode (LED) unit configured to emit light of adjustable brightness and prescribed color locus, wherein the LED unit has a microcontroller and a plurality of LEDs,
wherein the microcontroller and the LEDs are surrounded by a package of the LED unit,
wherein the LED unit is further configured to communicate bidirectionally with the processing module via the microcontroller of the LED unit so that a present status value of the LED unit is receivable by the processing module from the microcontroller of the LED unit, which present status value is representative of a functionality of the LED unit; and
a plurality of LED units, wherein individual LED units of the plurality of LED units are actuated by a digital datastream in a form of a bitstream that is supplied to the individual LED units by the internal data bus of the lighting apparatus and wherein the internal data bus comprises a line for a clock and a line for the bitstream.

10. The lighting system as claimed in claim 9, in which the lighting apparatus is arranged in the motor vehicle and is in the form of interior lighting.

11. The lighting system as claimed in claim 9, in which the lighting apparatus is arranged on an outside of the motor vehicle and is in the form of exterior lighting.

12. A method for operating a lighting system for a motor vehicle, the lighting system comprising a lighting apparatus having a processing module configured to receive, process and send signals from an internal data bus, a light-emitting diode (LED) unit configured to emit light of adjustable brightness and prescribed color locus, wherein the LED unit has a microcontroller and a plurality of LEDs, wherein the microcontroller and the LEDs are surrounded by a package of the LED unit, and wherein the LED unit is further configured to communicate bidirectionally with the processing module via the microcontroller of the LED unit, and having a plurality of LED units, the method comprising:

receiving status signals of the LED unit from the microcontroller of the LED unit by the processing module, which status signals are representative of a functionality of the LED unit, ascertaining a present status value of the LED unit by the processing module based on the received status signals of the LED unit, controlling a function of the motor vehicle based on the ascertained status value of the LED unit, and actuating individual LED units of the plurality of LED units by a digital datastream in a form of a bitstream that is supplied to the individual LED units by the internal data bus of the lighting apparatus, wherein the internal data bus comprises a line for a clock and a line for the bitstream.

13. The method as claimed in claim 12, wherein controlling the function of the motor vehicle based on the ascertained status value of the LED unit comprises outputting information based on the ascertained status value of the LED unit.

14. The method as claimed in claim 12, wherein controlling the function of the motor vehicle based on the ascertained status value of the LED unit comprises deactivating a function of the motor vehicle based on the ascertained status value of the LED unit.

15. The method as claimed in claim 13, wherein controlling the function of the motor vehicle based on the ascertained status value of the LED unit comprises deactivating a function of the motor vehicle based on the ascertained status value of the LED unit.

16. The lighting apparatus as claimed in claim 1, wherein the present status value of the LED unit comprises data about a current/voltage characteristic of the LED unit or a number of operating hours of the LED unit.

17. The lighting system as claimed in claim 9, wherein the present status value of the LED unit comprises data about a current/voltage characteristic of the LED unit or a number of operating hours of the LED unit.

18. The method as claimed in claim 12, wherein the present status value of the LED unit comprises data about a current/voltage characteristic of the LED unit or a number of operating hours of the LED unit and further comprising drawing a conclusion about a lifespan of the LED unit from the present status value.

* * * * *